United States Patent [19]

Basset et al.

[11] Patent Number: 4,861,848

[45] Date of Patent: Aug. 29, 1989

[54] POLYMERIZATION OF UNSATURATED HYDROCARBONS WITH AN INDUCTION PERIOD

[75] Inventors: Jean-Marie Basset; Michel Leconte, both of Villeurbanne; Jean Ollivier, Arudy; Francoise Quignard, Lyons, all of France

[73] Assignee: Societe Nationale Elf Aquitaine, France

[21] Appl. No.: 88,045

[22] Filed: Aug. 21, 1987

[30] Foreign Application Priority Data

Aug. 22, 1986 [FR] France .................. 86 11978

[51] Int. Cl.$^4$ .................. C08F 4/78; C08F 32/08
[52] U.S. Cl. .................. 526/169; 502/103; 526/142; 526/283; 264/328.6
[58] Field of Search .................. 526/169

[56] References Cited

U.S. PATENT DOCUMENTS 3,849,509  11/1974  Streck et al. .................. 526/142
4,400,340   8/1983  Klosiewicg .................. 526/169
4,550,216  10/1985  Basset et al. .................. 585/646

FOREIGN PATENT DOCUMENTS 1007397  3/1977  Canada .
 222432  5/1987  European Pat. Off. ............ 526/169

OTHER PUBLICATIONS

Boor, Ziegler-Notta Catalysts and Polymerizations, Academic Press (N.Y.) pp. 603–604 (1979).
Dodd et al., Journal of Molecular Catalysis, 15 (1982) 103–110.

Primary Examiner—Edward J. Smith
Attorney, Agent, or Firm—Ostrolenk, Faber, Gerb & Soffen

[57] ABSTRACT

Process of polymerization of unsaturated hydrocarbons, with an initial induction period, by means of a catalyst constituted by a halogeno-phenate of tungsten, of which the phenate group carries one or more substituents, in the presence of an organometallic co-catalyst; the halogeno-phenate is chosen from amongst those represented by the formula

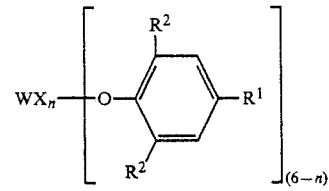

where X is a halogen, especially Cl or Br, n is a whole number 2, 3 or 4, $R^1$ is H or a $C_1$ to $C_8$ straight- or branched-chain alkoxy group, $R^2$ is H or a $C_3$ to $C_9$ branched-chain alkyl group, $R^1$ and $R^2$ never being hydrogen simultaneously.

21 Claims, No Drawings

POLYMERIZATION OF UNSATURATED HYDROCARBONS WITH AN INDUCTION PERIOD

DESCRIPTION

The present invention relates to an improved process of polymerization by metathesis of unsaturated hydrocarbons; it envisages more particularly the case where a polymerisation reaction which is slow at the beginning and becomes very rapid after a certain initial induction period is required. Thus, the invention is highly useful in moulding processes or other operations with polymers where a certain manipulation time of the monomer is necessary before its hardening. It therefore presents remarkable advantages in, amongst others, the process known as RIM ("Reaction Injection moulding"), that is to say moulding by injection with reaction, which consists of injecting into a mould two liquid streams: (1) a monomer containing a polymerisation catalyst and (2) the same monomer, or another, containing a co-catalyst. In this type of process, a first period of about 3 to 15 minutes without reaction, or with a very slow polymerisation, followed by as rapid a reaction as possible is required. By a specific choice of catalyst, the present invention permits realisation of these conditions in a simple and economic manner, without any of the complications which the prior technique in this area involved.

In the presence of certain metathesis catalyst systems, some cyclin olefins, notably dicyclopentadiene, undergo a rapid polymerisation reaction leading to hard, rigid polymers possessing very good shock resistance properties. One such polymerisation can be realised, according to U.S. Pat. No. 4,400,340, in the presence of catalytic systems comprising $WCl_6$, a phenol and an organoaluminum compound. French Patent Publication No. 2 547 513 (or U.S. No. 4,550,216) has shown that metathesis catalysts of the type

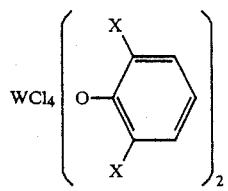

(X=halogen or another electronegative group), associated with $C_2H_5AlCl_2$, also allow a very rapid polymerisation to be obtained. On the other hand, numerous compounds of the type $WCl_2(OAr)_4$ (OAr=aryloxy group) are known as active in the metallisation reaction of olefins, when they are associated with organoaluminum compounds (H. T. DODD and K. J. RUTT, Journal of Molecular Catalysts, 15 (1982) 103-120; F. QUIGNARD, M. LECONTE and J. M. BASSET, J. of Mol. Catal., 28 (1985) 27-32). Numerous other complexes of W of the same type are mentioned in French Patent Publication No. 2 180 038, compounds containing diisopropyl phenate groups being particularly suited to the polymerisation of cyclic olefins. U.S. Pat. No. 4,038,471 cites, as being able to be used in the preparation of polyocteneomers and polybuteneomers, the compounds tungsten pentachlorophenate and tetrachloro bis (2-chlorophenate) tungsten.

There exists therefore a great abundance of metathesis catalysts, according to the technical literature. And, nevertheless, when it is a matter of obtaining a rapid polymerisation, but with an initial slow period, or a initial dead time, as in the case of RIM mentioned above, no-one has been able to apply an appropriate catalytic system alone; one has been obliged to use a "moderator" additive in one of the two streams, in order to avoid blockage, by premature polymerisation, taking place in the injection device, before the mould. It is thus that U.S. Pat. No. 4,400,340 describes the addition of moderators or retarders such as ethers, esters, ketones or nitriles or monomers containing the reaction activator, which is most often an alkyl aluminum, to the polymerisation of dicyclopentadiene. This addition complicates the moulding due to the fact that introduction of extraneous substances modifies the properties of the polymer to some extent. But it has not been possible hitherto to avoid the use of a moderator because no theory permitted prediction of the nature of the catalyst to be chosen, in order that rapid polymerisation took place only after a certain reaction-free time, after the addition of catalyst or monomer. All the catalytic systems, experimented upon up to present, promote reaction after their addition to the monomer; and the rate of polymerisation varies little in the course of moulding; these systems do not lend themselves therefore to operation without moderator. There has been, in consequence, very little chance of finding, among the numerous catalysts, described in the literature, those which would be suitable without moderator, and such investigations would have necessitated hundreds, if not thousands, of tests.

Despite this absence of all indicators, the inventors of the present new process have thought that a high speed of polymerisation with an initial dead time should be obtained with halogen complexes of tungsten having one or more phenoxy groups, where these latter have branched alkyls at positions 2 and 6, and/or an alkoxy at 4. Although certain of such compounds had been indicated in the chemical literature as metathesis catalysts, it was impossible for the reasons indicated above, to deduce from that that they would be suitable selectively for polymerisation with an initial dead time.

Thus, the process according to the invention, for the polymerisation of dicyclopentadiene, with an initial induction period, in the absence of a moderating agent from the polymerisation, with the aid of a catalyst of the formula

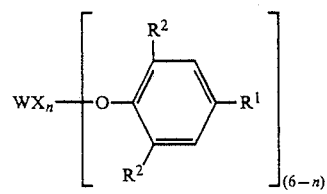

where X is Cl or Br, n is 2 to 4, $R^1$ is H or an alkoxy group and $R^2$ H or a branched-chain $C_3$ to $C_9$ alkyl, this catalyst being accompanied by an organometallic co-catalyst, is characterised in that, in the catalyst used, $R^1$ is a $C_1$ to $C_8$ alkoxy group, the $R^2$s being H and n=2 or 3, or $R^1$ is H when the $R^2$s are branched chain $C_3$ to $C_9$ alkyls in which case n must be 3 or 4.

The $R^1$ alkoxy groups can, in particular, correspond to the following formulae

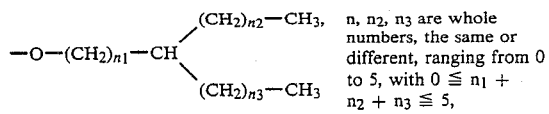
m ranging from 0 to 7

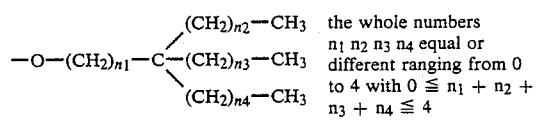
n, n₂, n₃ are whole numbers, the same or different, ranging from 0 to 5, with $0 \leq n_1 + n_2 + n_3 \leq 5$,

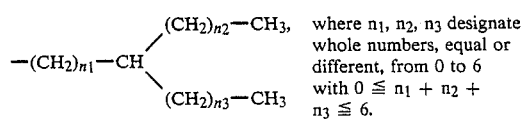
the whole numbers $n_1$ $n_2$ $n_3$ $n_4$ equal or different ranging from 0 to 4 with $0 \leq n_1 + n_2 + n_3 + n_4 \leq 4$ The branched alkyls $R^2$ can be such as isopropyl, isobutyl, tert-butyl, iso-amyl, tert-amyl or similar; they can, for example, have the structure

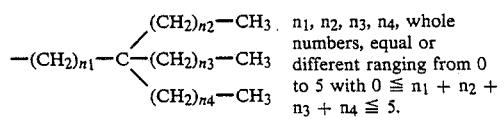
where $n_1$, $n_2$, $n_3$ designate whole numbers, equal or different, from 0 to 6 with $0 \leq n_1 + n_2 + n_3 \leq 6$.

Other examples of alkyls $R^2$ are represented by the formula $-(CH_2)_{n_1}-C\begin{matrix}(CH_2)_{n_2}-CH_3\\(CH_2)_{n_3}-CH_3\\(CH_2)_{n_4}-CH_3\end{matrix}$  $n_1$, $n_2$, $n_3$, $n_4$, whole numbers, equal or different ranging from 0 to 5 with $0 \leq n_1 + n_2 + n_3 + n_4 \leq 5$.

When alkyl, the two $R^2$s must be branched, but are not necessarily identical; they can differ by a large number of carbon atoms, for example one can be iso-amyl and the other 2,4-dimethylheptyl.

When the two $R^2$s are H, it is preferable that n is 2; however, with branched alkyls in $R^2$, the preferred value for n is 3.

Thus, in the preferred form of the invention, X is Cl, n is equal to 2, $R^1$ is the methoxy group —OCH₃ and $R^2$ is a hydrogen atom; the compound, designated by (A) hereafter in the present description, corresponds to the formula:

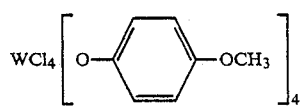

In the other preferred form of the invention, n is equal to 3, $R^1$ is a hydrogen atom and $R^2$ is the group

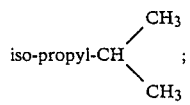

the compound, designated hereafter by (B), corresponds to the formula:

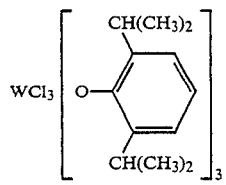

The process according to the invention uses, just as the known techniques, co-catalysts or activators associated with the tungsten catalyst. Various organometallic compounds, known as co-catalysts, can be employed, notably combinations of the types LiR, RMgX, SnR₄, PbR$_m$X$_{(4-m)}$ etc. and above all R₃Al, R₂AlX or RAlX². Thus one obtains excellent results with the classic activators C₂H₅AlCl₂ or (C₂H₅)₂AlCl.

In the case, industrially very important, of polymerisation of dicyclopentadiene by the RIM method above, the preferred form of process of the invention is realised with a dicylcopentadiene/catalyst molar ratio lying between 100 and 20000 and an alkylaluminum/catalyst molar ratio from 6 to 24. In a particularly preferred form, the dicyclopentadiene/catalyst ratio is between 2000 and 4000 and the alkylaluminum/catalyst ratio equal to 12. The polymerisation reaction can be carried out just as well in the absence or presence of solvent. Solvents which can be used are for example chlorobenzene, benzene or toluene.

The reactants, that is to say the dicyclopentadiene, the catalyst ((A) or (B)), the alkylaluminum co-catalyst and, if necessary, the solvent are mixed and shaken at ambient temperature; the reaction mixture remains fluid for a period of 5 min to 10 min. Once this period of induction is over, the polymerisation commences and, after about ten seconds an increase in temperature and the solidification of the middle of the reaction with the formation of a polymer which is hard, compact and insoluble in the organic solvents mentioned.

The initial period, slow or dead, of 5 to 10 minutes, indicated above, corresponds to a particular industrial step; it is however possible, with the process according to the invention, to provide such an initial period of any necessary duration, notably from 1 to 20 minutes.

A series of compounds, of general formulae WCl₂(OAr)₄, WCl₃(OAr)₃ and WCl₄(OAr)₂, related to catalysts (A) and (B) were used in the polymerisation of dicyclopentadiene under the same conditions as the catalysts (A) and (B).

Representative examples of these compounds are given below under the denominations (C) to (L):

| | |
|---|---|
| tungsten dichloro tetrakis phenate | (C) |
| dichloro tetrakis (3-methylphenate) of tungsten | (D) |
| dichloro tetrakis (3,5-dimethylphenate) of tungsten | (E) |
| dichloro tetrakis (4-t-butylphenate) of tungsten | (F) |
| dichloro tetrakis (4-chlorophenate) of tungsten | (G) |
| trichloro tris (2,6-dimethylphenate) of tungsten | (H) |
| trichloro tris (2,4,6-trimethylphenate) of tungsten | (I) |
| tetrachloro bis (2,6-diphenylphenate) of tungsten | (J) |
| tetrachloro bis (2,6-dichlorophenate) of tungsten | (K) |
| tetrachloro bis (2,6-difluorophenate) of tungsten | (L) |

It was noted that none of these compounds produced a polymerisation induction period comparable to that which was found with the catalysts (A) and (B). On the contrary, it was observed that the total polymerisation of dicylcopentadiene takes place very rapidly, in times between about 5s and about 120s after mixture of the reactants.

It appears therefore that the chosen catalysts (A) and (B) according to the invention are very specific and promote particularly well the polymerisation of dicyclopentadiene by the RIM process because they allow one to obtain, with a catalytic system simplified to two components, on account of the complete absence of moderator, hard, rigid and insoluble polymers with a speed of reaction compatible with an RIM process.

Examples 1 and 2 hereafter show how catalysts according to the present invention can be prepared. Examples 3 to 14 illustrate the specificity of these catalysts compared with related catalysts, when they are employed in the polymerisation of cyclopentadiene.

EXAMPLE 1

Preparation of the catalyst dichloro tetrakis (4-methoxy phenatel of tungsten (A)

Into a three-necked vessel, surmounted by a condenser and swept by a current of dry argon, 3.3 g WCl$_6$(8.25×10$^{-3}$ mol), of 4.12 g of 4-methoxy phenol (33.0×10$^{-3}$ mol) and 70 ml of anhydrous toluene are introduced. After heating to 80° C. for 6 hours, evaporation of toluene and chromatography on a silica column (eluant: CH$_2$Cl$_2$/CCl$_4$=90/10), 2.8 g of product in the form of crystals of a lustrous black colour are recovered. The elemental analysis conformed to the formula:

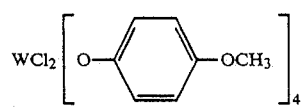

Calculated: C=45.00%, H=3.75%, Cl=9.5%, W=24.63%.
Analysis: C=45.10%, H=3.76%, Cl=9.84%, W=24.63%.

EXAMPLE 2

Preparation of the catalyst trichloro tris(2,6-diisopropyl phenate) of tungsten (B)

Into a three-necked vessel, surmounted by a condenser and swept by a current of dry argon, 4.53 g of WCl$_6$(11.4×10$^-$mol), 6.33 g of 2,6-diisopropylphenol (34.2×10$^{-3}$ mol) and 30 ml of anhydrous carbon tetrachloride are introduced. After heating to 75° C. for 5 hours and evaporation of carbon tetrachloride, a black oil is recovered which was chromatographed on a silica column (eluant; toluene/cyclohexane=25/75). After recrystallisation from ethanol at −5° C., 6.6 g of product in the form of parallelepipedical crystals of black colour are obtained.

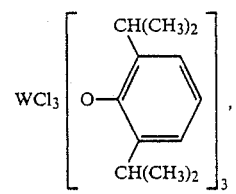

Calculated: C=52.5%, H=6.21%, Cl=12.96%, W=22.40%.
Analysis: C=52.31%, H=6.50%, Cl=— 12.99%, W=22.62%.

EXAMPLES 3 TO 14

Polymerisation of dicyclopentadiene with the catalysts (A) to (L)

The tests consist of carrying out the polymerisation of dicylcopentadiene, using the catalytic systems comprising the catalysts (A) to (L) described above and the alkylaluminum chloride C$_2$H$_5$AlCl$_2$, and of comparing the rates of polymerisation obtained with each of the catalysts.

In a vessel for batch operation, previously purged with argon, 0.5×10$^{-4}$ mol of tungsten compound (catalyst), 10 ml of chlorobenzene serving as solvent, 13.5 ml of dicyclopentadiene, corresponding to a dicyclopentadiene/catalyst molar ratio equal to 2000, and, finally, 6×10$^{-4}$ mol of C$_2$H$_5$AlCl$_2$, as co-catalyst, are introduced; the latter corresponding to a C$_2$H$_5$AlCl$_2$/catalyst molar ratio equal to 12. The addition of C$_2$H$_5$AlCl$_2$ determined the time zero of the reaction. The reactants were shaken at ambient temperature, and after a variable time after the start of the reaction, an increase in the viscosity of the reaction medium is observed; then, very rapidly, it produces an almost instantaneous and total solidification of the mixture with formation of a hard, compact and insoluble polymer. At the same time, the temperature of the reaction medium is monitored and it is noted that onset of polymerisation corresponds to an increase in temperature which reaches a maximum when the polymerisation is complete.

In the table below there are indicated, for each catalyst (A) to (L), the times elapsed at the onset of polymerisation, as well as the maximum increase in temperature. It is to be noted that all the catalysts (A) to (L) lead to hard and insoluble polymers.

TABLE

| Example no. | Catalyst | Time of reaction up to start of polymerisation | Maximum increase in temperature |
|---|---|---|---|
| 3 | A | 600 s | 18.9° C. |
| 4 | B | 310 s | 23° C. |
| 5 | C | 40 s | 4.5° C. |
| 6 | D | 55 s | 5.9° C. |
| 7 | E | 80 s | 6.9° C. |
| 8 | F | 45 s | 5.8° C. |
| 9 | G | 120 s | 6.1° C. |
| 10 | H | 55 s | 7.3° C. |
| 11 | I | 10 s | 5.6° C. |
| 12 | J | 30 s | 6.5° C. |
| 13 | K | 10 s | 4.7° C. |
| 14 | L | 5 s | 4.1° C. |

It is noted that the catalysts (A) and (B) have a quite particular behaviour, if one compares therewith the related compounds (C) to (L). They produce an induction period before the onset of polymerisation which is sufficiently long for it to be possible to employ them easily in the polymerisation of dicyclopentadiene by the RIM process without need for a moderator. It is noted on the other hand that the polymerisation reaction carried out with catalyst (A) or (B) involves a strong evolution of heat which leads to the conclusion that, after the induction period, polymerisation takes place very rapidly and completely. The other compounds (C) to (L) produce induction periods of less than 2 min, and for the most part less than 1 min, this rendering their use difficult in the polymerisation of dicyclopentadiene by the RIM process and makes the use of a polymerisation moderator necessary.

EXAMPLES 15 TO 17

In analogous manner to Examples 1 and 2, three catalysts of different formula but according to the definition of the invention are prepared. As for the preceding Examples, the time of reaction to onset of polymerisation, as well as the maximum increase in temperature ($\Delta T$ max) is determined; the results below were obtained.

| Example no. | Catalyst | Time | $\Delta T$max |
|---|---|---|---|
| 15 | Dichlorotetrakis (4-ethoxyphenate) of tungsten | 560 s | 17.5° C. |
| 16 | Dichlorotetrakis (4-butoxy phenate) of tungsten | 480 s | 16° C. |
| 17 | Trichlorotris (2,6-ditertiary-butyl phenate) of tungsten | 340 s | 20.5° C. |

Comparison of these results with those of the Table of Examples 3-14 confirms the advantages of the invention, because the catalysts 15 to 17 produce an initial period without polymerisation, unlike the classic catalysts C to L, and, besides, a much higher maximum increase in temperature.

EXAMPLES 18 TO 20

Preparation of plates of polydicyclopentadiene by polymerisation in a mould; comparison of catalysts A and B with catalyst C.

These tests consist of mixing the reactants; catalyst (A, B or C), co-catalyst and dicylcopentadiene in a vessel for batch operation, then transferring the mixture thus obtained into a parallelepipedical mould, which is closed but separable into two parts, in which the polymerisation is to be effected. The mould is connected directly to the vessel by the intermediary of a transfer tube. In the vessel for batch operation, previously purged with argon, $0.5 \times 10^{-4}$ mol of catalyst A, B or C and 27 ml of dicyclopentadiene, corresponding to a dicyclopentadiene/catalyst molar ratio of 4000 are introduced. The mixture is shaken for 1 min at ambient temperature, which allows the catalyst to dissolve in the monomer. To this solution, $6 \times 10^{-4}$ mole of $C_2H_5AlCl_2$ (co-catalyst) in solution in 1 ml of chlorobenzene are added; this corresponding to a $C_2H_5AlCl_5$/catalyst molar ratio equal to 12.

EXAMPLE 18

Catalyst A described above.

The mixture of reactants is shaken for about 1 min at ambient temperature in the vessel; it is then transferred into the mould, and left at the ambient temperature. The mixture being sufficiently fluid, this transfer was possible easily, and the mould of interior dimensions $55 \times 110 \times 5$ mm was able to be filled completely. The polymerisation of dicyclopentadiene was effected in the mould; it is opened after about 15 min and a plate which is well-formed, hard, rigid, insoluble in chlorobenzene, benzene and toluene and has good characteristics of resistance to shocks and breakage is removed.

EXAMPLE 19

Catalyst B described above.

The moulding was carried out as in Example 18 and everything took place similarly.

EXAMPLE 20

Catalyst C described above.

It was not possible to shake the mixture of the reactants for more than about ten seconds, because it rapidly became very viscous. It would therefore not have been possible to transfer it into the mould after mixing. This is the classic type of catalyst, which can be used in the RIM process only when a polymerisation moderator is added to the reaction mixture. In contrast, the catalysts A and B selected according to the process of the invention allow the RIM system to be used without any moderator, as Examples 18 and 19 show.

We claim:

1. A process of polymerisation of dicyclopentadiene by reaction injection molding, with an initial induction period comprising, in the absence of a polymerisation moderator, combining in a mold dicyclopentadiene, a catalyst of the formula

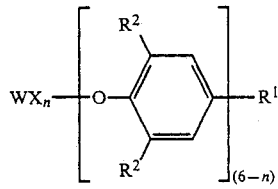

where X is Cl or Br, n is 2 to 4, $R^1$ is H or an alkoxy group and $R^2$ is H or a branched $C_3$ to $C_9$ alkyl, and an organoaluminum co-catalyst, wherein (a) $R^1$ is a $C_1$ to $C_8$ alkoxy group, the $R^2$s are H and n=2 or 3, or (b) $R^1$ is H, the $R^2$s are branched $C_3$ to $C_9$ alkyls, and n is 3 or 4.

2. Process according to claim 1, characterised in that $R^1$ is an alkoxy $-O-(CH_2)_m-CH_3$, with m ranging from 0 to 7.

3. Process according to claim 1, characterised in that $R^1$ is an alkoxy of the type

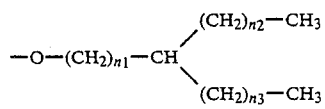

where $n_1$, $n_2$ and $n_3$ are whole numbers, equal or different, ranging from 0 to 5 with $0 \leq n_1 + n_2 + n_3 \leq 5$.

4. Process according to claim 1, characterised in that $R^1$ is an alkoxy of the type

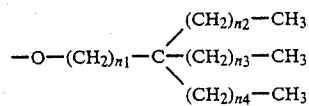

where $n_1$, $n_2$, $n_3$ and $n_4$ are whole numbers from 0 to 4 satisfying the condition $0 \leq n_1+n_2+n_3+n_4 \leq 4$.

5. Process according to claim 1, characterised in that $R^2$ is isopropyl, isobutyl, tert-butyl, iso-amyl or tert-amyl.

6. Process according to claim 1, characterised in that $R^2$ is

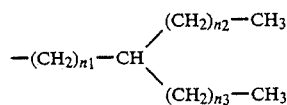

$n_1$, $n_2$ and $n_3$ designating whole numbers, equal or different, from 0 to 6 related by the relationship $0 \leq n_1+n_2+n_3 \leq 6$.

7. Process according to claim 1, characterised in that $R^2$ is

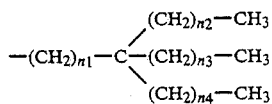

where $n_1$, $n_2$, $n_3$ and $n_4$, whole numbers, equal or different, range from 0 to 5, satisfy the condition $0 \leq n_1+n_2+n_3+n_4 \leq 5$.

8. Process according to claim 1, characterised in that the two branched alkyls $R_2$ are different from each other.

9. Process according to claim 1, characterised in that the induction period, before commencement of the rapid polymerisation, is from 1 to 20 min.

10. Process according to claim 1, characterised in that the catalyst and the co-catalyst are first added to the dicyclopentadiene in a mixing zone and that the mixture is then transferred into the mold where the polymerisation takes place.

11. Process according to claim 10, characterised in that the catalyst is trichloro tris (2,6-diisopropylphenate) of tungsten and the co-catalyst is $C_2H_5AlCl_2$ or $(C_2H_5)_2AlCl$.

12. Process according to claim 10, characterised in that the catalyst is dichloro tetrakis (4-methoxy phenate) of tungsten and the co-catalyst is $C_2H_5AlCl_2$ or $(C_2H_5)_2AlCl$.

13. Process according to claim 2 characterized in that $R^1$ is methoxy, ethoxy, propoxy or butoxy.

14. Process according to claim 1 characterized in that $R^2$ is H and n is 2.

15. Process according to claim 1 characterized in that $R^2$ is alkyl and n is 3.

16. Process according to claim 1 characterized in that the molar ratio of dicyclopentadiene/catalyst is between 100 and 20,000 and the cocatalyst/catalyst molar ratio is from 6 to 24.

17. Process according to claim 16 characterized in that $R^2$ is H and n is 2.

18. Process according to claim 16 characterized in that $R^2$ is alkyl and n is 3.

19. Process according to claim 16, characterized in that the catalyst is trichloro tris (2,6-diisopropylphenate) of tungsten and the co-catalyst is $C_2H_5AlCl_2$ or $(C_2H_5)_2AlCl$.

20. Process according to claim 16, characterized in that the catalyst is dichloro tetrakis (4-methoxy phenate) of tungsten and the co-catalyst is $C_2H_5AlCl_2$ or $(C_2H_5)_2AlCl$.

21. Process according to claim 9 wherein said induction period is 5 to 10 minutes.

* * * * *